US012014717B2

(12) United States Patent
Lin

(10) Patent No.: US 12,014,717 B2
(45) Date of Patent: Jun. 18, 2024

(54) ACTIVE NOISE CANCELLING CORD

(71) Applicant: Chung-Liang Lin, Taichung (TW)

(72) Inventor: Chung-Liang Lin, Taichung (TW)

( * ) Notice: Subject to any disclaimer, the term of this patent is extended or adjusted under 35 U.S.C. 154(b) by 0 days.

(21) Appl. No.: 17/723,496

(22) Filed: Apr. 19, 2022

(65) Prior Publication Data

US 2023/0335102 A1 Oct. 19, 2023

(51) Int. Cl.
*G10K 11/178* (2006.01)
*H04R 1/10* (2006.01)

(52) U.S. Cl.
CPC .. *G10K 11/1785* (2018.01); *G10K 2210/1081* (2013.01); *H04R 1/1083* (2013.01)

(58) Field of Classification Search
CPC ....... G10K 11/1785; G10K 2210/1081; H04R 1/1083
See application file for complete search history.

(56) References Cited

U.S. PATENT DOCUMENTS 8,270,323 B2 * 9/2012 Agazzi ..................... H04B 3/23 370/286
8,509,050 B2 * 8/2013 Hobbel .................. H04B 3/466 379/406.01
9,660,695 B2 * 5/2017 Alloin ...................... H04B 3/46
2020/0014206 A1 * 1/2020 Haartsen ................ H02J 3/381

FOREIGN PATENT DOCUMENTS

DE 102016209883 A1 * 12/2016 ......... B60R 16/0215
WO WO-2021197017 A1 * 10/2021

* cited by examiner

*Primary Examiner* — David L Ton

(57) ABSTRACT

An active noise cancelling cord contains: a plug including a ground-wire conductor, a live-wire conductor, and a neutral-wire conductor; a socket including a protrusion in which a first receiving orifice, a second receiving orifice and a third receiving orifice are defined; and a noise reduction mode. The body is connected with a plug and a socket, and a shell is located between the plug and the socket. The conductive set includes a ground wire electrically connected with a ground-wire conductor and a first receiving orifice, a live wire electrically connected with a live-wire conductor and a second receiving orifice, a neutral wire electrically connected with a neutral-wire conductor and a third receiving orifice, a plug anti-noise wire electrically connected with a live-wire conductor, and the noise reduction mode, and a socket anti-noise wire electrically connected with the second receiving orifice and the noise reduction mode.

4 Claims, 2 Drawing Sheets

ACTIVE NOISE CANCELLING CORD

FIELD OF THE INVENTION

The present invention relates to an active noise cancelling cord which is capable of producing magnetic field spectrum of low-frequency around 7.83 Hz to enhance sound quality of a corrected audio.

BACKGROUND OF THE INVENTION

Generally speaking, the higher the level of audio and recording equipment or equipment, the higher the demand for noise reduction. For example, playing music contains noise, resulting in loss of sound quality; or, some noise is recorded in the monitored content, which affects subsequent judgments.

A user is used to wearing headphones to isolate high-frequency noise from entering my ears, which is a passive noise reduction method. A noise reduction structure for audio and recording equipment actively eliminate low-frequency noise.

The known noise reduction structure is commonly found in a three-pin plug of audio and recording equipment, and a three-pin socket in the home. Taking the plug as an example, the three feet are distributed in an isosceles triangle, the feet at the vertex of the triangle are defined as the ground wire conductive sheet, and the feet at the bottom two points of the triangle are regarded as the live wire (also known as the phase wire) conductive sheet and the neutral wire (also known as the water wire). Wire) conductive sheet, enter the corresponding ground wire jack, live wire jack and neutral wire jack of the socket respectively, supply stable power and reduce noise generation.

The present invention has arisen to mitigate and/or obviate the afore-described disadvantages.

SUMMARY OF THE INVENTION

The primary aspect of the present invention is to provide an active noise cancelling cord which is capable of producing magnetic field spectrum of low-frequency around 7.83 Hz to enhance sound quality of a corrected audio.

Another aspect of the present invention is to provide an active noise cancelling cord by which when the body is conductive, a power is transmitted to the socket from the plug via the ground wire, the live wire, and the neutral wire; the plug anti-noise wire sends audio to the noise reduction mode so that the noise reduction mode compares a frequency (such as a power of 60 Hz), and a noise of the audio is offset by a reverse signal, hence messages of corrected phase imbalance recover to smooth sinusoidal waveforms; the tone quality mode produces magnetic field spectrum of low-frequency around 7.83 Hz (also known as the Schumann wave) to enhance sound quality of a corrected audio.

To obtain the above-mentioned aspects, an active noise cancelling cord provided by the present invention contains: a plug including a ground-wire conductor, a live-wire conductor, and a neutral-wire conductor which extend from an edge of the plug.

A socket includes a protrusion in which a first receiving orifice is defined, and a second receiving orifice and a third receiving orifice are defined adjacent to the first receiving orifice.

A noise reduction mode is accommodated in a shell of the control box.

A first end of the body is connected with a plug, a second end of the body is connected with a socket, and the shell is fixed with the body and is located between the plug and the socket.

A conductive set includes a ground wire extending though the shell, a first end of the ground wire is electrically connected a ground-wire conductor, and a second end of the ground wire is electrically connected with the first receiving orifice.

The conductor set further includes a live wire extending through the shell, a first end of the live wire is electrically connected with a live-wire conductor, and a second end of the live wire is electrically connected with a second receiving orifice.

The conductor set further includes a neutral wire extending through the shell, a first end of the neutral wire is electrically connected with a neutral-wire conductor, and a second end of the neutral wire is electrically connected with a third receiving orifice.

The conductor set further includes a plug anti-noise wire, a first end of the plug anti-noise wire is electrically connected with a live-wire conductor, and a second end of the plug anti-noise wire is accommodated in the shell and is electrically connected with the noise reduction mode.

The conductor set further includes a socket anti-noise wire, a first end of the socket anti-noise wire is electrically connected with the second receiving orifice, and a second end of the socket anti-noise wire is electrically connected with the noise reduction mode.

DETAILED DESCRIPTION OF THE FIRST EMBODIMENTS

Figure 1:
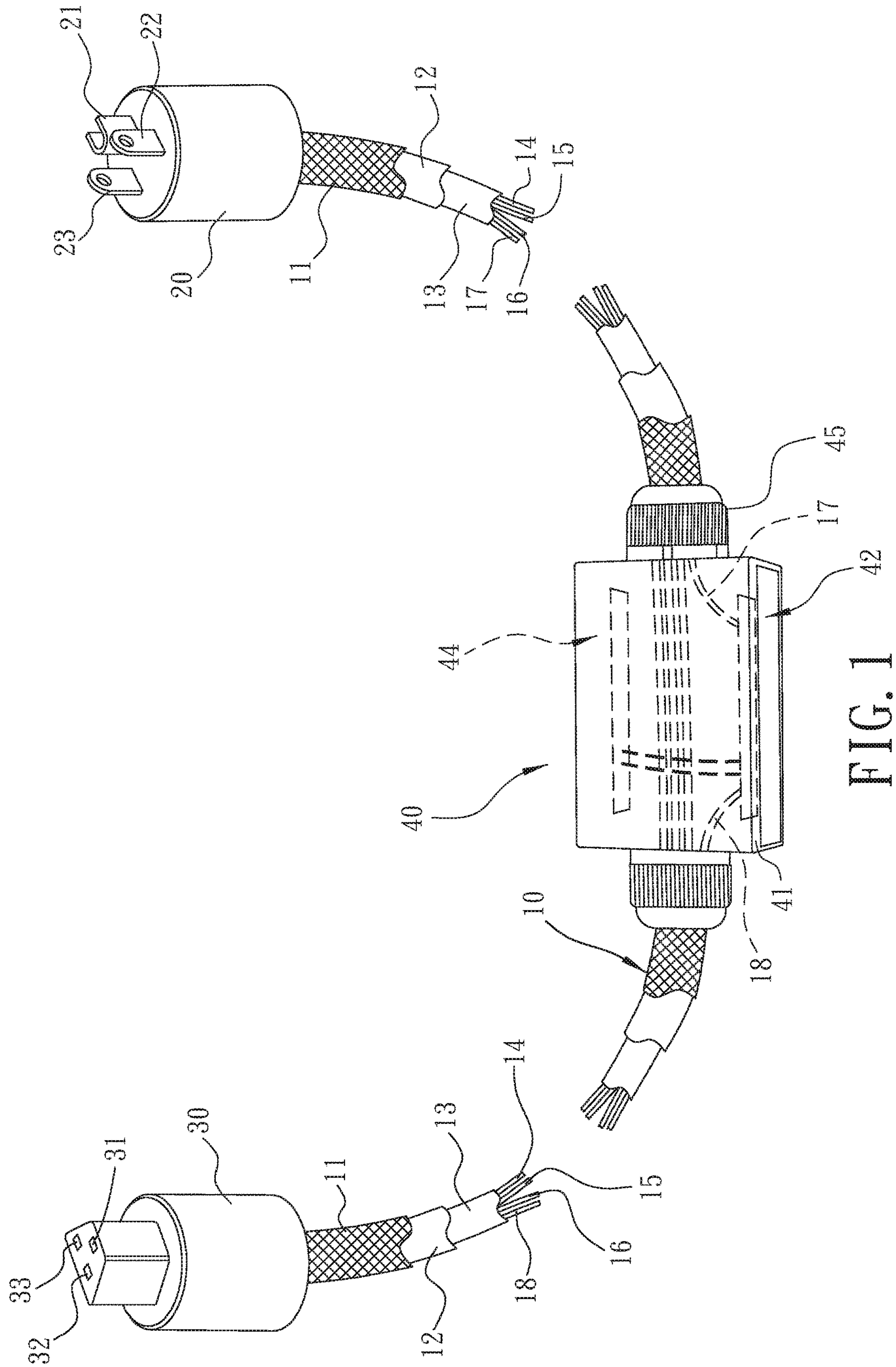
FIG. 1 is a schematic view showing the assembly of a body of an active noise cancelling cord according to a preferred embodiment of the present invention.

With reference to FIG. 1, an active noise cancelling cord according to a preferred embodiment of the present invention comprises: a body 10, a first end of the body 10 is connected with a plug 20, and a second end of the body 10 is connected with a socket 30. A control box 40 is fixed on the body 10 by using two screw buts 45, wherein the control box 40 is fixed between the plug 20 and the socket 30.

The body 10 is a multilayer wire and includes a protective layer 11, a synthetic plastic layer 12 covered by the protective layer 11, a filling layer 13 inside the synthetic plastic layer 12, and a conductive set inside the filling layer 13.

The protective layer 11 is flexible and is configured to isolate fluids and contaminated substances. The synthetic plastic layer 12 is made of polymer materials (such as polyvinyl chloride, PVC). In this embodiment, the synthetic plastic layer 12 includes far-infrared nano-substances in a wavelength of 3 μm to 1000 μm, and the far-infrared nano-substances are metal oxide. The filling layer 13 is made of cotton threads and is defined between the conductive set and the synthetic plastic layer 12, thus reducing vibration of an external force to the conductive set. The conductive set includes a ground wire 14, a live wire 15, a neutral wire 16, a plug anti-noise wire 17, and a socket anti-noise wire 18.

The plug 20 is assemble and detachable, wherein a first end of the plug 20 is connected with a body 10, and the plug 20 includes a ground-wire conductor 21, a live-wire conductor 22, and a neutral-wire conductor 23 which extend from an edge of the plug 20. The ground-wire conductor 21 is connected with the ground wire 14 and the plug anti-noise wire 17, the live-wire conductor 22 is connected with a first end of the live wire 15, and the neutral-wire conductor 23 is connected with the neutral wire 16.

The socket 30 is assemble and detachable, the second end of the body 10 is connected with the socket 30, and the socket 30 includes a protrusion in which a first receiving orifice 31 is defined, and a second receiving orifice 32 and a third receiving orifice 33 are defined adjacent to the first receiving orifice 31. The first receiving orifice 31 accommodates the ground wire 14 and the socket anti-noise wire 18, the second receiving orifice 32 receives a second end of the live wire 15, and the third receiving orifice 33 accommodates the neutral wire 16.

Figure 2:
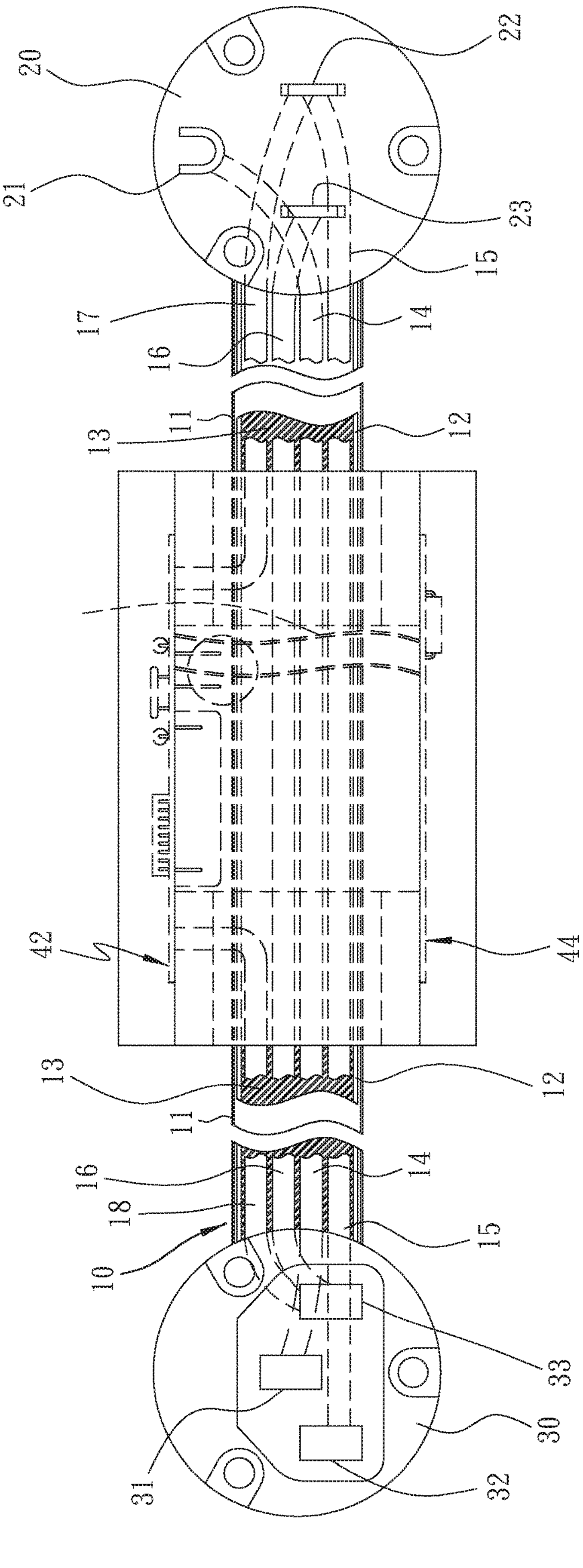
FIG. 2 is a schematic view showing the assembly of a control box according to the preferred embodiment of the present invention.

With reference to FIG. 2, the control box 40 includes a shell 41 configured to accommodate an electronic circuit, and at least one electric wire 43 is configured to connect a noise reduction mode 42 and a tone quality mode 44 in a serial connecting manner or in a parallel connecting manner, wherein the noise reduction mode 42 is electrically connected with the plug anti-noise wire 17 and the socket anti-noise wire 18, such that the ground wire 14 and the live wire 15 pass through the shell 41 and are not cut.

When the body 10 is conductive, a power is transmitted to the socket from the plug via the ground wire 14, the live wire 15, and the neutral wire 16. The plug anti-noise wire 17 sends audio to the noise reduction mode 42 so that the noise reduction mode 4 compares a frequency (such as a power of 60 Hz), and a noise of the audio is offset by a reverse signal, hence messages of corrected phase imbalance recover to smooth sinusoidal waveforms. The tone quality mode 44 produces magnetic field spectrum of low-frequency around 7.83 Hz (also known as the Schumann wave) to enhance sound quality of a corrected audio.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. An active noise cancelling cord comprising:

a plug including a ground-wire conductor, a live-wire conductor, and a neutral-wire conductor which extend from an edge of the plug;

a socket including a protrusion in which a first receiving orifice is defined, and a second receiving orifice and a third receiving orifice are defined adjacent to the first receiving orifice;

a noise reduction element accommodated in a shell of a control box; and a first end of a body being connected with a plug, and a second end of a body being connected with a socket, a housing of the active noise cancelling cord is fixed with the body and is located between the plug and the socket;

wherein a conductor set includes a ground wire extending though the housing of the active noise cancelling cord, a first end of the ground wire is electrically connected the ground-wire conductor, and a second end of the ground wire is electrically connected with the first receiving orifice;

wherein the conductor set further includes a live wire extending through the housing of the active noise cancelling cord, a first end of the live wire is electrically connected with the live-wire conductor, and a second end of the live wire is electrically connected with the second receiving orifice;

wherein the conductor set further includes a neutral wire extending through the housing of the active noise cancelling cord, a first end of the neutral wire is electrically connected with the neutral-wire conductor, and a second end of the neutral wire is electrically connected with the third receiving orifice;

wherein the conductor set further includes a plug anti-noise wire, a first end of the plug anti-noise wire is electrically connected with a live-wire conductor, and a second end of the plug anti-noise wire is accommodated in the housing of the active noise cancelling cord and is electrically connected with the noise reduction element;

wherein the conductor set further includes a socket anti-noise wire, a first end of the socket anti-noise wire is electrically connected with the second receiving orifice, and a second end of the socket anti-noise wire is electrically connected with the noise reduction element.

2. The active noise cancelling cord as claimed in claim 1, wherein the housing of the active noise cancelling cord accommodates a tone quality element connected with the noise reduction element in a serial connecting manner or in a parallel connecting manner.

3. The active noise cancelling cord as claimed in claim 1, wherein the body includes a protective layer, a synthetic plastic layer covered by the protective layer, a filling layer inside the synthetic plastic layer, and the conductor set inside the filling layer.

4. The active noise cancelling cord as claimed in claim 2, wherein the body includes a protective layer, a synthetic plastic layer covered by the protective layer, a filling layer inside the synthetic plastic layer, and the conductor set inside the filling layer.

* * * * *